United States Patent [19]

Strauff

[11] 3,973,589

[45] Aug. 10, 1976

[54] CONTROL VALVE

[75] Inventor: Günther Strauff, Kaarst, Germany

[73] Assignee: Langen & Co., Dusseldorf, Germany

[22] Filed: Dec. 18, 1974

[21] Appl. No.: 533,787

Related U.S. Application Data

[63] Continuation-in-part of Ser. No. 316,396, Dec. 18, 1972, abandoned.

[52] U.S. Cl. .................................. 137/596; 91/370
[51] Int. Cl.² ........................................ F15B 13/14
[58] Field of Search ............. 91/370, 371, 372, 373, 91/374, 375 R, 375 A; 137/596, 625.69

[56] References Cited
UNITED STATES PATENTS

| | | | |
|---|---|---|---|
| 2,930,357 | 3/1960 | Brueder | 91/372 |
| 3,180,233 | 4/1965 | Jablonsky | 91/374 |

FOREIGN PATENTS OR APPLICATIONS

| | | | |
|---|---|---|---|
| 1,101,290 | 10/1955 | France | 137/596 |
| 2,127,762 | 12/1972 | Germany | 91/370 |
| 1,920,826 | 11/1970 | Germany | 91/375 A |

*Primary Examiner*—Alan Cohan
*Assistant Examiner*—Gerald A. Michalsky
*Attorney, Agent, or Firm*—Holman & Stern

[57] ABSTRACT

A control valve for hydraulic servo-steering systems embodying connections for a pressure-source, a discharge and a servo-steering motor provided with a valve member, with the valve member being connected with one section of a divided steering shaft or spindle, in which one or a plurality of adjustable control pistons or reaction pistons are arranged preferably transverse and off-center to the axis of the valve member, and are activated by an activator device rotatable through a small angle relative to the valve member, and connected with the other section of the steering spindle, the activator means being positioned with one part of its length in or on the valve member, whereby the valve member is rotatably and axially immovably positioned in a generally affixed connection body, or in a sleeve connected therewith, in a manner so that the supply and release of a pressure medium into or out of the valve member, independent of the relative position of the connection body and valve member to each other, is guaranteed with the aid of bores and annular grooves, the control valve including a removable cap exposing means which the control or reaction pistons can be adjusted while the hydraulic system is still operative.

1 Claim, 9 Drawing Figures

CONTROL VALVE

This application is a continuation-in-part of applicant's copending application Ser. No. 316,396, filed Dec. 18, 1972, now abandoned.

BACKGROUND OF THE INVENTION

The present invention relates to a control valve, and more particularly to a control valve for hydraulic servo-steering systems for road vehicles.

PRIOR ART

Prior art control valves of this type (German Pat. No. 1,133,642 and German Pat. No. 1,125,296) are provided with a cup-shaped, connection-body, the bottom of which has a sealed inlet opening for the activator member and the inside of which not only serves for receiving the member which cooperates with the connection body, but also for receiving those members which carry the pistons. The center is covered by a front lid or cap member provided with a part sealingly constructed as part of the valve body which extends into one working space of a servo motor. It is of great disadvantage that adjustment, maintenance and repair-operations cannot be performed efficiently in such an arrangement of assembly, although adjustments are possible, however, to disconnect and axially displace the connection member, the hydraulic circuit is no longer operative and functional.

OBJECTS AND SUMMARY OF THE INVENTION

It is the object of the instant invention to remove such disadvantages, i.e., to provide an arrangement for control valves whereby adjustment, maintenance, and repair-operations are possible in an easy manner without dismantling the important hydraulic control components and disturbing their functional operative relationship.

The solution of this problem is provided by this invention by means of the combination of the following features:

a. the activator means can be positioned in or on the valve member;

b. the valve member comprises in general a first part cooperating with a connecting body or with a sleeve connected thereto, and a second part, containing the control or reaction-pistons, with the second part extending axially beyond the connection body; and c. a cup-like lid or cover enclosing the second part containing the pistons is secured in a sealed manner to the connection body and the bottom thereof is provided with a sealed inlet means for the activator device of the valve member.

By means of the mere removal of the lid, the pistons can be reached and are adjustably accessible and the zero-position (neutral position) of the control valve, for example, can be adjusted by means of suitable set screws, etc., in a convenient manner. Since there are no bearing points in the lid or cover, the lid, since it is not subject to stress or hydraulic pressure within, can be of light-weight construction. A further advantage is the fact that the manufacture is simplified since the sealed position of the lid, or cover, does not require critical machining and expense of construction as is encountered when incorporating bearing points.

BRIEF DESCRIPTION OF THE DRAWINGS

The invention will become more apparent through a consideration of the following description taken in conjunction with the drawings forming a part thereof, in which.

DESCRIPTION OF THE PREFERRED EMBODIMENTS

Figure 1:
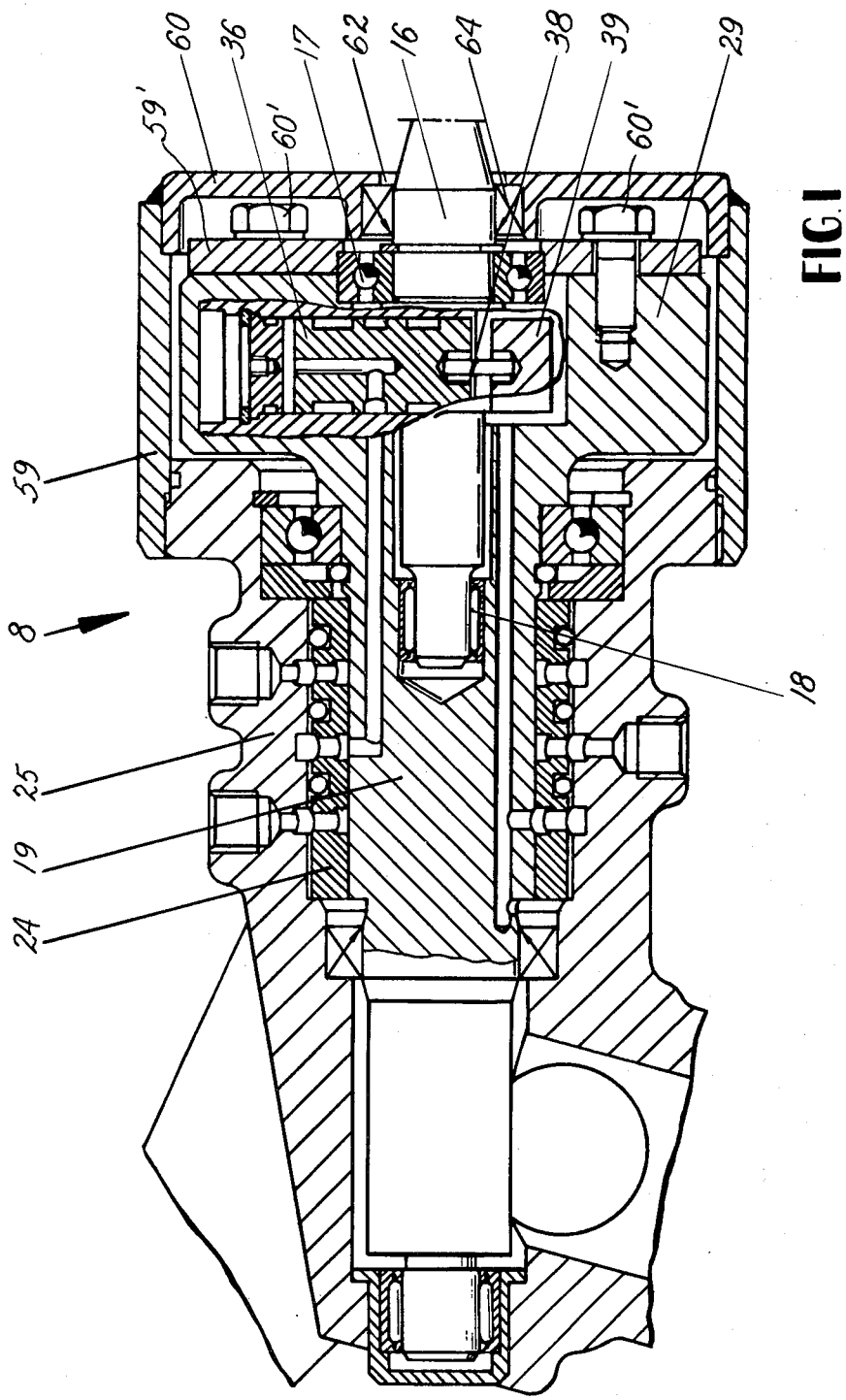
FIG. 1 is a longitudinal cross-sectional view of the control valve of the invention, portions being broken away and shown in section.

Referring first to FIG. 1, a control valve assembly 8 comprises a connection body 25, having an axial sleeve 24 arranged in a bore in the interior of the body 25. A valve part 19 of a valve member projects through the sleeve 24 and is integral with an enlarged rear portion 29 which extends axially and rearwardly beyond the rear end of the connection body 25. Valve part 29 carries control or reaction-pistons (one shown at 36); and these control pistons will be described in detail particularly with respect to FIG. 3. The control pistons are activated by activator means comprising a shaft 16 journaled in space bearings 17 and 18, respectively, in valve parts 19 and 29 of the valve member. A lever 39 is fixedly connected to and operated by the activator shaft 16 and thrust members or links 37 and 38 extend between the lever 39 and the control pistons in spaced relation with respect to the longitudinal axis of the shaft or activator means 16 (see FIG. 3).

Figure 6:
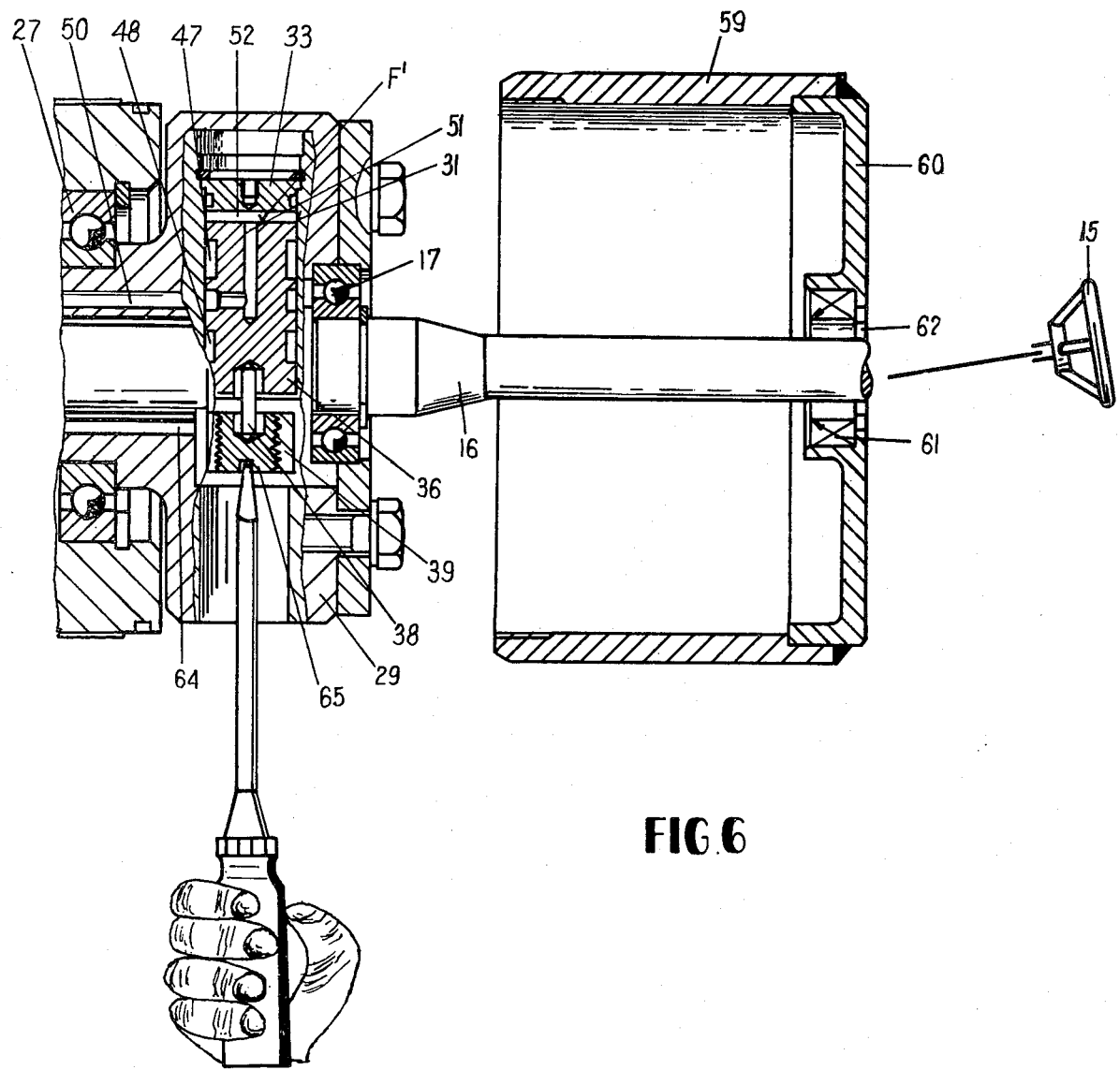
FIG. 6 is a fragmentary section of the system of FIG. 2 (corresponding to FIG. 4), partially disassembled, with the lid being axially removed and illustrating how adjustment can be made while the hydraulic system is still operative.

A cup-shaped cover, or lid, 59 is sealingly secured on the connection body 25 and is shaped so that it encloses valve part 29 but is separable from the valve part (see FIG. 6), without interfering with the operable hydraulic circuit as will subsequently be described in detail. The cover 59 includes a rear plate 60 incorporating an axial opening 62 through which the activator shaft 16 projects and provides an annular seat for a sealing ring 64.

The valve assembly 8 is maintained in its operative functional relationship in the hydraulic circuit in which it is installed after the cup or lid 59 is removed, and the valve assembly is retained in assembled relationship by means of a retainer plate 59' by means of machine screws 60'. The plate 59' incorporates an undercut portion providing the seat for the bearing 17.

Figure 2:
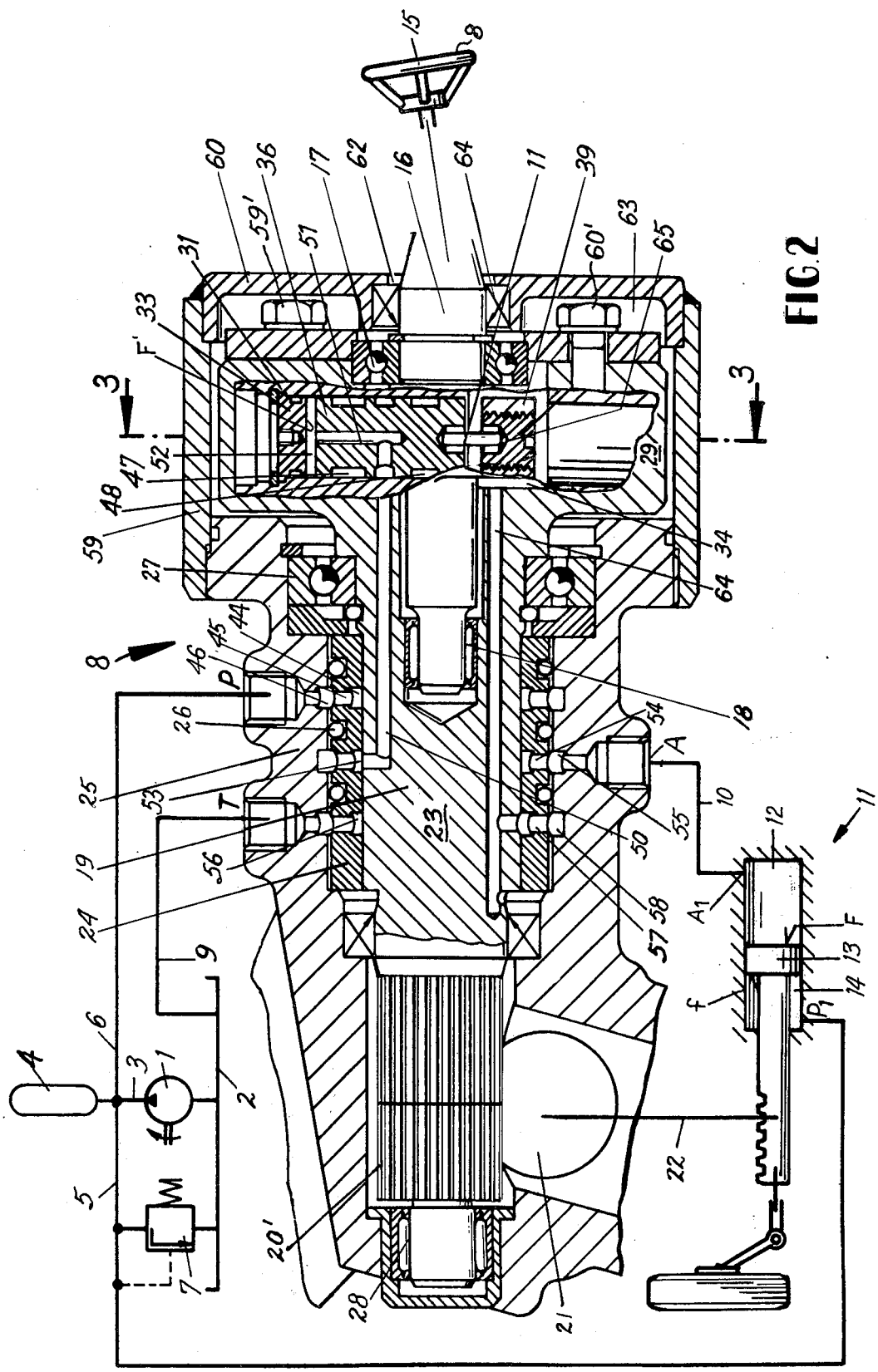
FIG. 2 shows the control valve of FIG. 1 in a hydraulic system shown diagrammatically in conjunction with a servo-motor having different-sized operating areas.
Figure 3:
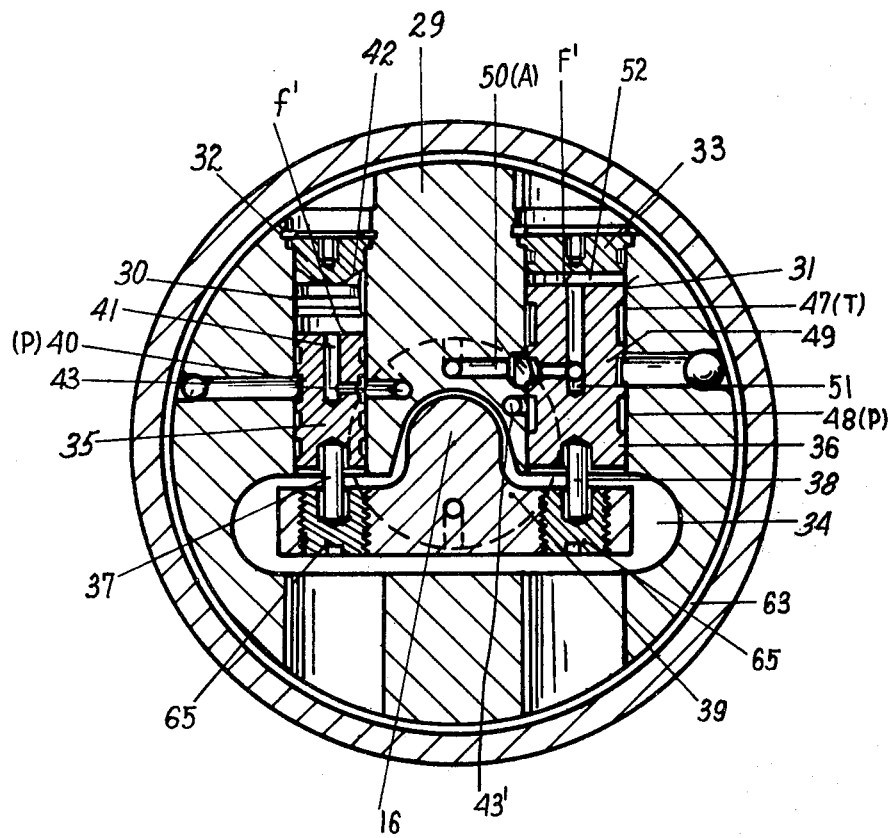
FIG. 3 is a section of a control valve of FIG. 2 taken on the plane of line 3—3 of FIG. 2.

The control valve assembly 8 is illustrated in detail with respect to a diagrammatically illustrated hydraulic circuit in FIG. 2, and in its operative relationship with respect to a servo motor incorporated in the hydraulic circuit. Referring to FIGS. 2 and 3, fluid is drawn from a collector tank 2 by means of a pressure pump 1, and pressurized fluid is supplied through pipe 3 to a fluid-pressure storage means 4 as well as to pipes 5 and 6. Between the pipe 5 and storage tank 2 is a pressure-release valve 7, and pipe 6 leads to an inlet connection means P of the control valve assembly 8. The control valve assembly 8 includes an outlet connection means T for a return-flow pipe 9 which communicates with collector tank 2. The control valve assembly also includes connection means A, which is connected to connection means $A_1$ of a servo motor 11 by means of pipe 10. The connection means $A_1$ connects to a working space 12 of a servo motor which is arranged to have the largest effective area F of piston 15. A pipe 5 connects to a connection member $P_1$ of the servo motor communicating with a working space 14 which has a smaller effective area of the piston 13.

The steering wheel (activator) 15 is connected to the first activator part 16 of the steering wheel shaft which is divided into two axial sections; part 16 is journaled in a second activator section 19 of a steering wheel shaft by means of spaced bearings 17 and 18.

The section 19 includes a pinion gear 20 which operates a gear rack 21; the gear rack 21 being operatively connected to the piston 13 of the servo motor 11 (shown diagrammatically at 22). Activator section 19 is provided with a cylindrical part 23 which cooperates with the sleeve or bushing 24 surrounding the cylindrical part. The bushing 24, in contrast to the generally fixedly attached connection body or member 25, which is provided with the fluid connection means A, P and T, is fixed against axial movement, but has a diameter which is somewhat less than the diameter of the bore in which the sleeve 24 is disposed. The annular space between part 23 and sleeve 24 is sealed at its ends by means of suitable sealing members.

The activator section 19, and the pinion 20' which is fixedly connected thereto, are journaled in the connecting or body member 25 by means of bearings 27 and 28.

The activator section 19 is provided, in addition to the cylindrical element or portion 23, with an enlarged diameter part 29 which part 29 extends rearwardly beyond the bushing 24 as well as the connecting member or body 25, whereby part 29 serves as the valving member.

Referring to FIG. 3 and the valving member 29, this valving member includes bores 30 and 31 which are located off-center with respect to the longitudinal axis of the valving member in spaced transverse relation thereto, and these bores are sealed at one end by means of plugs 32 and 33, respectively, the ends of the bores communicating with a slot-shaped hollow space 34 which extends approximately at right angles to the bores 30 and 31. A reaction piston 35 is slidably disposed in bore 30, and a control piston 36 is slidably disposed in bore 31.

The reaction piston 35 and control piston 36 affect, by means of push rods or links 37 and 38, respectively, an activator means 39 in the form of a bilateral lever which is fixedly connected to the activator section 16.

The activator means 39 is somewhat shorter in width than the hollow space 34, so that it is able to rotate therein through a pre-determined angle or value, before it abuts against the valve member 29 and effects a mechanical contact. The reaction piston 35 is provided with an annular groove 40 approximately in the center of its axial expanse, with a channel 41 leading into a reaction chamber 42 which is located between the plug 32 and the central area $f'$ of the reaction piston 35. A channel 43 terminates and communicates with the annular groove 40, which channel 43 extends within the valve member 29 and part 23 (not shown in detail), and communicates with an annular groove 44 in the bushing 24 (see FIG. 2). The annular groove 44 is in permanent communication with a further annular groove 46 by means of a transverse bore 45 which connects to the connection means T. Since the annular groove 40 is in constant communication with the connection means P, the annular groove 40 (FIG. 3) is additionally indicated by the reference numeral (P).

The control piston 36 (FIGS. 2 and 3) is provided with two axially separated annular grooves 47 and 48, between which is located a shoulder 49 which, in a neutral position, blocks a channel 50 which channel terminates into the bore 31. A channel 51 within the control piston 36 permanently connects the channel 50 with a reaction chamber 52 between the plug 33 and the frontal area F' of the control piston 36. The channel 50 extends through the valve body 29 and the part 23 up to an annular groove 53 in the bushing 24. The annular groove 53 is permanently connected with an annular groove 55 in the connection member 25, by means of a transverse bore 54, and the annular groove 55 terminates at the connection member A; the channel 50 in FIG. 3 is additionally indicated by means of the reference numeral (A). The annular groove 47 is in communication, in a similar manner, with an annular groove 56 in the bushing 24 by means of a channel (which is not shown in detail) in a similar manner, and the annular groove 56 is connected with annular groove 58 in the connection member 25 by means of a transverse bore 57. The connection means T terminates into the annular groove 58, and thus, the annular groove 47 in FIG. 3 is identified by the additional reference numeral (T). Into the annular groove 48 terminates a channel 43', which, like channel 43, leads into the annular groove 44. The annular groove 48, therefore, is given the additional reference numeral (P) for the purpose of clarification.

The pot-shaped lid, or cover, 59 is sealingly mounted on the connection member 25, which lid surrounds in spaced relation the valve member 29 which projects beyond the connection member 25, and cover 59 is apertured at 62 accommodating activator part 16 of the steering wheel shaft, through wall 60, and part 16 is sealed by means of a sealing member.

The annular space 63, between lid 59 and valve member 29, which communicates with the hollow space 34, is also connected with the annular groove 56 by means of channel 64.

Adjustment screws 65 in the activating (lever) means 39 affect the push rods 37 and 38 respectively engaging pistons 35 and 36 and, when the lid 59 is removed, permit (see FIG. 6) a precise adjustment of the neutral positions of the pistons 35 and 36 as well as simultaneously the adjusting of the symmetrical positioning of the activating lever means 39 relative to the valve member 29.

FLUID CIRCUIT FUNCTION

In the position as illustrated, the annular tee-slots 47 and 48 are separated by the transverse bore 50, so that the connections P and T are also separated from the connection A. The vehicle is driving straight ahead. Since the work space 14 is constantly connected with the pump 1, the piston 13 is hydraulically restrained. Pressure develops in the work space 12 which pressure, without outside power stress of the piston 13 in regards to the pressure in the work space 14, is reduced in the relation of the effective faces F:f. Under the requirement that the effective faces F' and f' of the pistons 36 and 35 show the same relationship, identical moments of reaction are transmitted to the lever 39. If then, for example, the steering wheel 15 is turned in a clock-wise direction, the section 16 turns by a small angle relative to the section 19 and in accordance with the lever 39, relative to the valve body 29. The reaction piston 35 is moved into the bore 30, while the control piston 36 is moved after the lever 39 by means of the pressure affecting the front face F'. The annular tee-slot 47 moves into the area of the transverse bore 50 without losing its connection with the additional transverse bore (not shown). This will provide for a connection of the system denoted by components 12, $A_1$, 10, A, 55, 54, 53, 50, 51, 52 with the systems denoted by components 52, 56, 57, 58, T, 9, 2, 64, 34 which is generally without pressure. A pressure reduction is developing in the first-mentioned system, and the servo piston 13 moves through the effects of pressure existing in the work space 14 into the work space 12 and supports thereby the steering movement until the annular tee-slot 47 is again separated from the transverse bore 50. Since in this entire process, the pressure on the front face f' is always bearing on the work space 14, and the front face F' is basically under the pressure of the work space 12, there develop various moments of reaction in accordance with the pressure difference at the pistons 35 and 36. In this case, the movement of reaction which is developed by the piston 35 is higher so that there results a moment directed entirely towards the clock-wise direction, which counteracts to the turning moment of the steering wheel 15. The driver thus obtains a certain feeling. If now the steering wheel 15 is turned in a counter-clock-wise direction the lever 39 turns by a small angle relative to the valve body 29 moving the control piston 36 into the bore 31. The annular tee-slot 48 moves into the area of the transverse bore 50 so that a connection develops between the systems defined by components 12, $A_1$, 10, A, 55, 54, 53, 50, 51, 52 and 1, 3, 4, 6, P, 46, 45, 44, 48, 43, 40, 41, 42 or in brief, from P to A. Since the pressure in P is always higher than that in A, there results a flow from P towards A and from A to $A_1$ to the work space 12. This pressure flow effects a rise in pressure in the work space 12 so that the piston 13 moves outwards and supports the steering gear 21 in the direction of the steering wheel movement. The support lasts until the annular tee-slot 48 is again separated from the transverse bore 50. Since again the front areas F' and f' are always under the pressure of the respective work spaces 12 and 14, there results through the increase of the pressure in the space 12 an increase of the moment of reaction effected by the piston 36 and thereby a moment which is directed toward the movement of the steering wheel 15.

It is now evident that there are neither pipe-connections nor bearing points positioned on the lid, or cover, 59. This produces various advantages. Due to the absence of bearing points, the lid, or cover, does not need to receive longitudinal or vertical forces and for this reason it can be light of weight. Furthermore, there is no need for double-centerings which is difficult to produce. The sealing means 61 requires a certain degree of centering, which, however, is by no means as difficult to produce as the centering for the load-receiving bearing means which is mounted free of play. It can finally also be seen that all the fluid pipes are connected to the connecting member 25. Since the areas 34 and 63 which are surrounded by the lid, are pressure-free and are connected with the connector T for the return-flow pipe 9, the lid 59 can be removed completely (see FIG. 6). The pistons 35 and 36 can then be reached for adjustment through bores 30', 31', respectively, without having to remove the same from the pipe-leads incorporating the hydraulic fluid circuit, and, when the pump 1 is switched off, they then can be dismantled.

In so far as set screws, or adjustment screws, 65 are utilized, as it is common in this type of servo steering systems, adjustments may be made when the pump 1 is in operation, namely, during a full hydraulic circuit function. It is therefore only necessary to collect or catch the leaking oil, which flows past the pistons 35 and 36, and possibly a part of the return-flowing pressure. In so far as the adjusting operations are performed on a test-stand, there most likely will be a container available by means of which the pressure fluid can flow back to the storage tank.

The adjusting or maintenance operations are mostly such functions which concern the adjusting of the neutral position of pistons 35, 36 at simultaneous symmetric positioning of the activator member 39 relative to the valve member 29. An assymmetric position, namely, could in an extreme case cause the developing of a mechanical contact between activator means 39 and valve member 29 before the desired rebalancing of the control piston 36 is completed, which rebalancing effects a servo-support by the servo motor 11.

Aside from the adjustability by means of the set, or adjustment, screw 65, there exists, of course, also the more costly possibility of mounting push rods 36 and 38 of various lengths.

Figure 4:
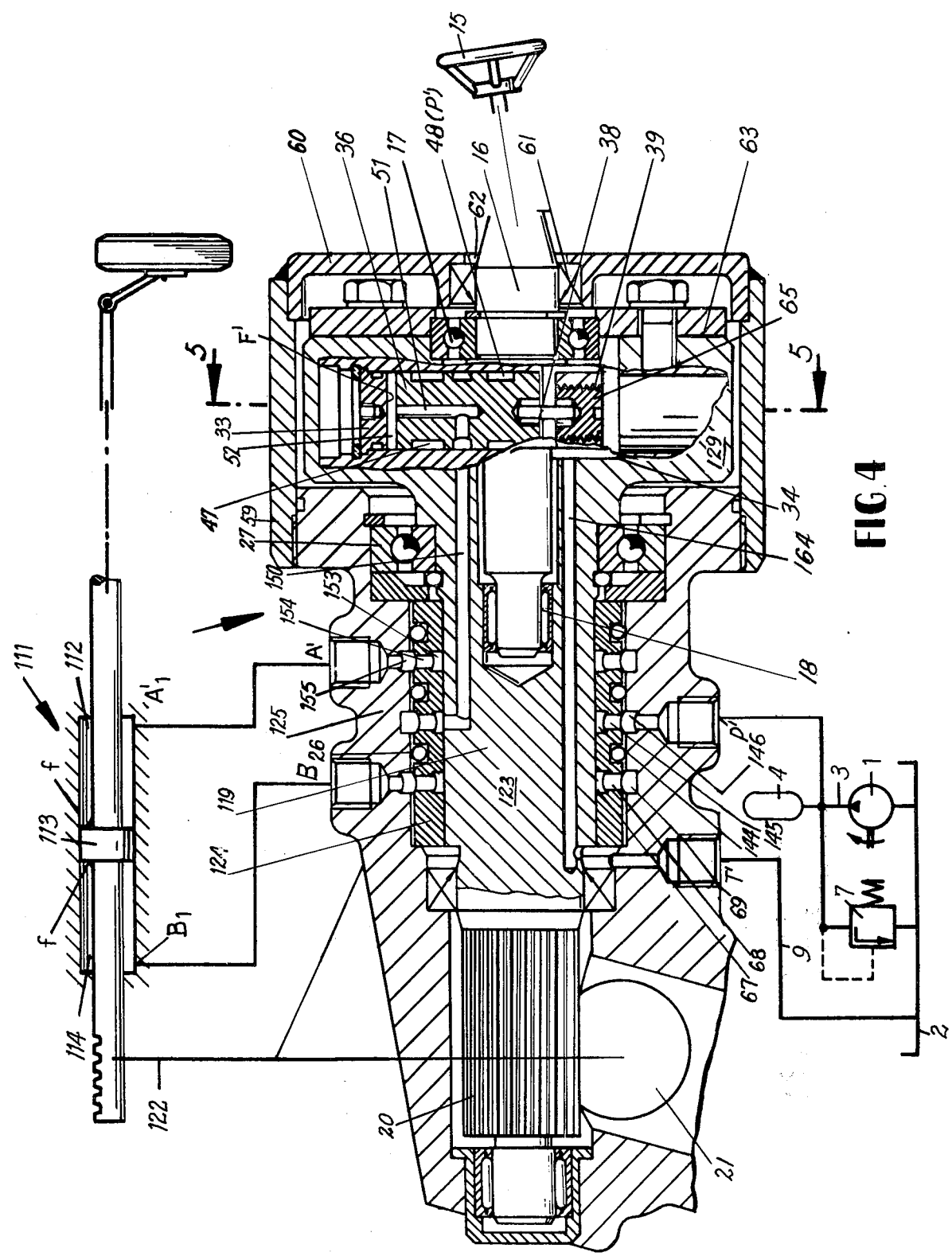
FIG. 4 is a view similar to that shown in FIG. 2, however, in conjunction with a servo motor having equal operating areas.
Figure 5:
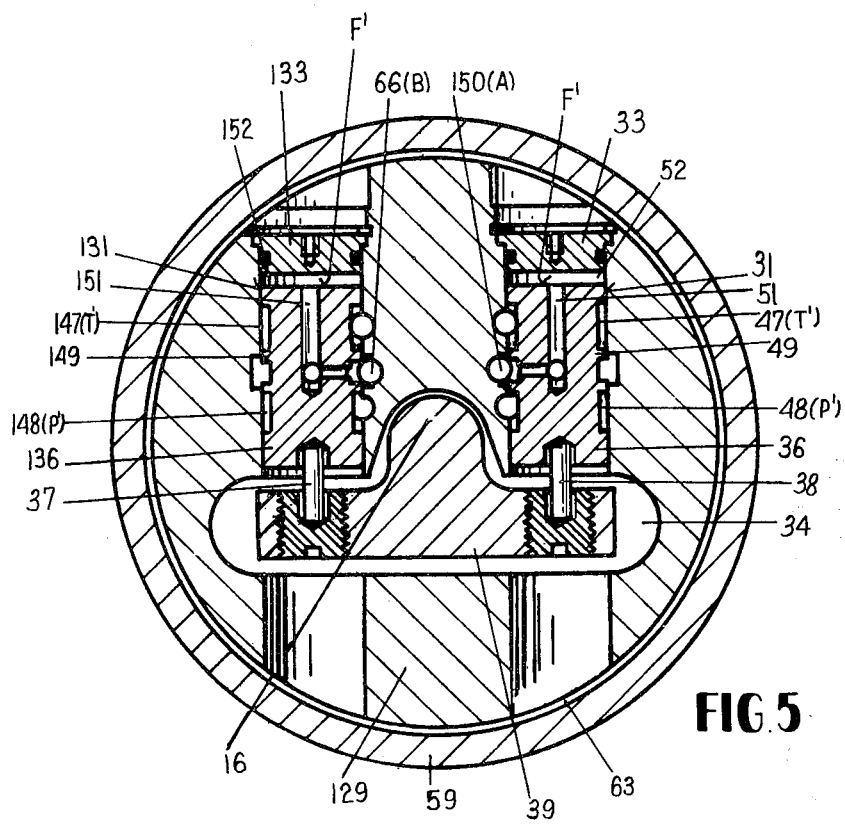
FIG. 5 is a section of the control valve of FIG. 4 taken on the plane of line 5—5 of FIG. 4.

The arrangement of FIGS. 4 and 5 differs from the one described above mainly in that the servo motor is provided with operational areas of the same size and each working space is provided with a control valve. For reasons of simplification, identical parts are provided with the identical reference numerals as seen in FIGS. 2 and 3. In so far as it concerns parts which are analogous to the parts already described above, the reference numerals are in the 100 series or, in so far as letters are concerned, a prime symbol has been added to the letter, namely, for example, 25–125 and A–A'. Accordingly, there are four connections, P', T', A' and B, arranged in connecting member 125, which are respectively in communication with the pump 1, the storage tank 2, the operational, or working, space 112 and the working space 114 of the servo motor 111. The control piston 36 is associated with connection A' and therewith the working space 112, and control piston 136 is arranged to the connection B and therewith to the working space 114. The connection between the control piston 36 and 136 as well as the respective connections P', T', A' and P', T', B is effected by means of transverse bores and/or channels in valve member 129, the component 123 as well as annular grooves and cross-bores in the bushing 124 similar to those described relative to FIGS. 2 and 3.

As long as no outer forces affect the steering wheel 15 and the steered vehicle wheels, the working spaces 111 and 112 are substantially without pressure, since the pressure-bearing annular grooves 48 and 148 have no connection to the channels 150 and 60, or, in short, since the connections P'–A' and P'–B are interrupted.

Figure 7:
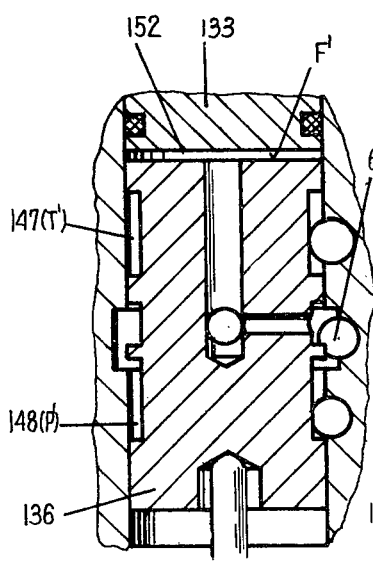
FIG. 7 illustrates one of the control pistons of FIG. 5, enlarged, and in a control position to connect the pump and servo motor.
Figure 8:
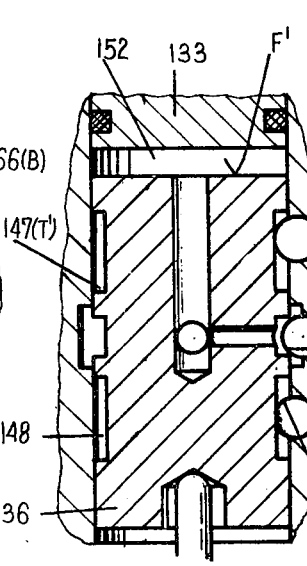
FIG. 8 shows the control piston of FIG. 7 in a neutral position.
Figure 9:
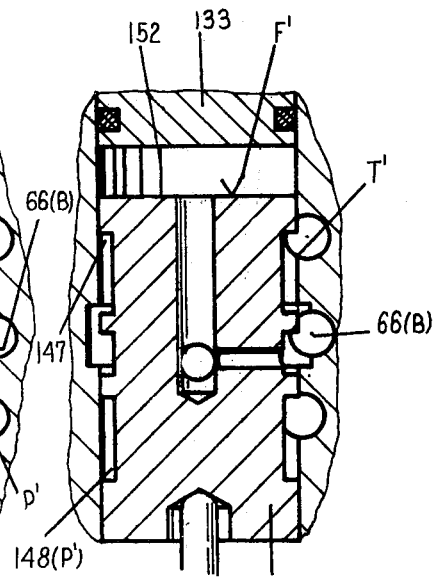
FIG. 9 shows the control piston of FIG. 7 in another control position to connect the servo motor and return pipe.

If the steering wheel is then moved in a clockwise direction, then the lever 39, in contrast to the valve member 129, will perform a smaller relative movement, by means of which the control piston 36 is pushed into the bore 31 in such a manner so that there results the fluid connection P'–A'. As a result of this, pressure is able to flow into the working space 112 and piston 113 is moved towards the left. Depending on the operational resistance which has to be overcome, the pressure in the working space 112 will develop more or less strongly, and will generally also develop in the reaction area 52 and will there counter-act the movement of the control piston 36. The driver of the vehicle senses the reactional moment which is produced by the activator means 39 as a feeling of driving. Since during the movement of piston 113 the working space 114 is reduced, pressure must be displaced. This will cause a lower pressure head which extends into the reaction space 152 and causes therein the control piston 136 to follow the activator means. The annular groove 147 moves thereby into the area of the channel 66 so that the connection B–T' is produced and pressure can flow out (see FIG. 9). During a movement of the activator means 39 in a clockwise direction, in the reverse case, the control piston 136 produces the connection P'–B (See FIG. 7), while the control piston 36 controls the outflow from the working space 112 via the connection A'–T'. It should here, as well as for FIGS. 2 and 3, be noted that when the steering wheel is being held in a fixed position, the connections produced will automatically close themselves, since the movements of the servo motor 111, as indicated by the line 133, are guided back to the pinion 20 and from there to the component 123 and the valve member 129. The valve member 129 follows therefore the movement of the activator means 39 until the connections are again closed in a neutral position (see FIG. 8).

Should the hydraulic system get out of commission due to breakage of a pipe or a similar cause, there will then develop a mechanical contact between the activator means and the valve member after a small dead-motion and will therewith produce a direct mechanical through-drive.

The function of the lid 59 is the same as already described for FIGS. 2 and 3. Adjustments on the control pistons 36 and 138 with the lid 59 loosened (see FIG. 6) are suitably made with the aid of set, or adjustment, screw 65. A single set screw 65, per se, will suffice for the precise setting of the neutral position of a piston, however, if simultaneously, the activator means 39 must be symmetrically adjusted with respect to the valve member 129, then a set screw must be provided for each of the control pistons 36 and 136.

What is claimed is:

1. In an adjustable control valve assembly for controlling an active, operative hydraulic fluid circuit of a servo steering system comprising, in combination: an elongated connection body having an axial bore therein, said connection body including means in said axial bore for communicating with the active hydraulic fluid circuit of the servo steering system;

control means including an axial valve part axially disposed in said means for communicating with active hydraulic circuit and having rotation on the longitudinal axis of the connection body, said control means including an enlarged portion projecting beyond one end of the connection body, said enlarged portion including mutually parallel bore portions extending through said enlarged portion and spaced on opposite sides of the longitudinal axis of said connection body, pistons in said bore portions including portions operatively connected to said means for communicating with the active fluid circuit, said control means including a portion having transverse enlargements intersecting the parallel bore portions, an activator journaled for rotation in said portion and having lever portions projecting laterally through the transverse enlargements and disposed in spaced relation from one end of the pistons, thrust members engaged between the lever portions and a respective piston, the improvement in which: said lever portions have screw-seats in alignment with the pistons and have means for permitting manual adjustment of the screw-seats relative to the parallel bore portions from the exterior of the enlargements, and a pot-shaped cover having an integral skirt projecting axially in surrounding relation to said enlarge portion and sealingly connected to said connection body, said cover including an aperture through which said activator projects, the interior of said cover communicating with the return line of the active hydraulic fluid circuit, means detachably connecting the cover to the connection body, said cover being displaceable axially on the activator from the connection body while the control means and hydraulic fluid circuit is operative to expose the enlarged portion of said control means and the parallel bores with the screw seats exposed for manual adjustment of the servo steering system.

* * * * *